United States Patent [19]

Narayan et al.

[11] Patent Number: 5,288,766
[45] Date of Patent: Feb. 22, 1994

[54] POYUREA BASED DISPERSIONS, FOAMS PREPARED THEREFROM, AND A PROCESS FOR THE PREPARATION THEREIN

[75] Inventors: Thirumurti Narayan, Grosse Ile, Mich.; Michael G. Kinnaird, Durham, N.C.

[73] Assignee: BASF Corporation, Parsippany, N.J.

[21] Appl. No.: 843,697

[22] Filed: Feb. 28, 1992

[51] Int. Cl.$^5$ .............................................. C08G 18/32
[52] U.S. Cl. ................................ 521/128; 252/182.13; 252/182.24; 252/182.27; 521/137; 521/155; 521/164; 521/170; 528/76; 528/68; 528/80; 528/85
[58] Field of Search ............... 521/155, 137, 164, 128, 521/170; 524/591, 714; 528/76, 80, 85, 68; 252/182.13, 182.24, 182.27

[56] References Cited

U.S. PATENT DOCUMENTS

| | | |
|---|---|---|
| 3,502,600 | 3/1970 | Kuhlkamp et al. . |
| 3,823,201 | 7/1974 | Pizzini et al. . |
| 4,042,537 | 8/1977 | Dahm et al. ............... 521/134 |
| 4,077,920 | 3/1978 | Yukuta et al. . |
| 4,093,569 | 6/1978 | Reischl et al. . |
| 4,292,226 | 9/1981 | Wenzel et al. ............... 524/591 |
| 4,326,043 | 4/1982 | Narayan et al. . |
| 4,359,541 | 11/1982 | Patton, Jr. et al. . |
| 4,374,209 | 2/1983 | Rowlands . |
| 4,386,167 | 5/1983 | Patton, Jr. et al. . |
| 4,500,656 | 2/1985 | Rasshofer et al. ............... 521/164 |
| 4,690,956 | 9/1987 | Ramlow et al. . |
| 4,735,970 | 4/1988 | Sommerfeld et al. . |
| 4,920,167 | 4/1990 | Ruetman et al. ............... 524/591 |
| 4,994,503 | 2/1991 | Harris et al. ............... 521/137 |

FOREIGN PATENT DOCUMENTS 1463069  2/1977  United Kingdom .

OTHER PUBLICATIONS

"The Chemical Structure of Some Diamine Carbamates," By Ephram Katchalski, Chaja Berliner-Klibanski, and Arie Berger, Apr. 1951, vol. 73, pp. 1829–1831.

*Primary Examiner*—John Kight, III
*Assistant Examiner*—John M. Cooney, Jr.
*Attorney, Agent, or Firm*—Dennis V. Carmen

[57] ABSTRACT

Stable urea group-containing dispersions are obtained in situ by reacting carbon dioxide with an amine in the presence of a continuous phase carrier. These amine/carbon dioxide condensation adducts dispersed in the carrier are employed in the formation of polyurethane foams, polyurethane elastomers and coatings, and polyurethane microcellular foams.

17 Claims, No Drawings

POYUREA BASED DISPERSIONS, FOAMS PREPARED THEREFROM, AND A PROCESS FOR THE PREPARATION THEREIN

BACKGROUND OF THE INVENTION

1. Field of the Invention

The present invention relates to stable dispersions obtained from the in situ reaction between carbon dioxide and an amine in the presence of a continuous phase carrier; to cellular and microcellular compositions obtainable from these dispersions; and to specific methods for making the dispersions. In particular, the invention relates to solid phase urea group-containing amine/carbon dioxide condensation adducts obtained under specific reaction conditions and dispersed in a continuous phase carrier, the urea group-containing stable dispersion being employed in the formation of foams and microcellular products.

2. Description of the Prior Art

It is known that the physical properties of foams can be altered by using urea or polyisocyanurate dispersions, or polymer modified polyols in the urethane forming process. Common examples of polymer modified polyols are those prepared by the in situ polymerization of a vinyl monomer in the presence of a polyether or polyester polyol as described in U.S. Pat. Nos. 3,652,639; 3,823,201; and 4,690,956. Examples of polyisocyanurate dispersions, optionally containing pendant urea groups, are described in U.S. Pat. Nos. 4,359,541, 4,386,167, and 4,326,043, and are generally prepared by polymerizing a polyisocyanate with a trimerization catalyst, deactivating the catalyst, reacting the free isocyanate groups with an active hydrogen compound such as an amine, and subsequently dispersing the product in the desired polyol. In this method, an amine is reacted with isocyanate and requires one to add the product to a polyol. It is also known that urea based dispersions may be obtained by the reaction of polyisocyanates with a polyamine and/or hydrazines and/or hydrazides as described in U.S. Pat. No. 4,042,537.

Other dispersions include polyisocyanate polyaddition based dispersions of the kind described in U.S. Pat. Nos. 4,374,209 and 4,093,569 formed by reacting an isocyanate with an alkanolamine in the presence of a polyol.

Carbamates of amines formed by the reaction between mono or polyfunctional amines with carbon dioxide at room temperature and atmospheric pressure are described in "The Chemical Structure of Some Diamine Carbamates," 73 *J. Am. Chem. Soc.* 1829 (1951). In particular, the carbamates described in this article are ammonium salts of alkylcarbamic acid. These amine carbamates are prepared at room temperature and atmospheric pressure in cold alcoholic solutions such as methanol, which is subsequently evaporated to eventually yield a dry carbamate powder. Carbamates prepared by this procedure find use as sources of carbon dioxide in plastic foams as described in U.S. Pat. No. 3,502,600. This patent teaches the formation of a plastic foam by combining an aqueous plastics dispersion of, for example, vinyl acetate with a compound having CH acidic hydrogens adjacent to a carbonyl or nitrilo group, and a pre-formed carbamate prepared by the procedure described in the journal article quoted above, and to this mixture is added an aldehyde which chemically reacts with and disassociates the carbamate to release carbon dioxide. Thus, there no longer remains solid particles in the foam since the carbamate was made to decompose by the addition of an aldehyde and to release carbon dioxide as a blowing agent for foaming action rather than remain as a carbamate dispersion.

Other patents have described the reaction of specific amines with carbon dioxide for the production of polyurethane foams. U.S Pat. Nos. 4,735,970 and 4,500,656 teach one to react an alkanolamine with carbon dioxide in the presence of a polyol to form a homogeneous mixture of an ammonium salt of an alkylcarbamic acid, or an amine/carbon dioxide adduct, and the polyol. U.S. Pat. No. 4,077,920 teaches one to form a carbamate-amine dispersion by bubbling carbon dioxide through an alkanolamine/polyol mixture, and compares the flame retardant properties of foams prepared by this dispersion with a foam prepared by a dispersion of carbamate-amines obtained by reacting an amine without hydroxyl groups and carbon dioxide. This reference, however, does not teach one to react an amine without hydroxyl groups with carbon dioxide at super-atmospheric pressures in the presence of a polyol to produce urea group-containing dispersions.

Finally, U.S. Pat. No. 4,994,503 teaches to improve the impact strength and flexural modulus of a foam by contacting a carbonyl compound, such as a urea, with a polyamine in the presence of a polyahl at atmospheric pressure, or reduced pressure, to produce aminocarbonyl dispersions.

SUMMARY OF THE INVENTION

The present invention relates to urea group-containing dispersions obtained by reacting under super-atmospheric conditions carbon dioxide and an amine without any hydroxyl groups in the presence of a continuous phase carrier; to a process for the preparation of the urea group-containing dispersion; and to foams prepared thereby. It has been unexpectedly found that polyurethane foams prepared by the urea group-containing dispersion of the invention exhibit excellent mechanical properties in tensile strength, tear strength, and elongation. The dispersion of the invention can be used to as fillers or reinforcing agents in the preparation of polyisocyanurate/polyurea/polyurethane polymers such as flexible or rigid foams, microcellular foams, coatings, castings, adhesives, films, and thermoplastics.

DESCRIPTION OF THE PREFERRED EMBODIMENT

In one aspect of the invention, the particulate dispersion comprises the reaction product of carbon dioxide and a polyamine formed in situ in the presence of a continuous phase carrier and under pressure. The closed reaction vessel may be externally heated to quickly drive the reaction toward the formation of urea groups, or one may rely solely on the heat created by the spontaneous exothermic reaction occurring within the closed vessel for the pressure to create urea groups. Optionally, metal catalysts may be employed to catalyze the reaction between the polyamine and carbon dioxide. If desired, the closed vessel may be cooled during the throughout the process of forming the dispersion so long as the reaction temperature remains at 50° C. or above. Whether the reaction vessel is closed, open, heated, left alone, or cooled, a stable urea group-containing dispersion formed by the reaction between carbon dioxide and an amine may be obtained if the reaction is carried out under super-atmospheric conditions at temperatures of at least 50° C.

The urea group-containing dispersion of the invention has a major yield of a urea group-containing solid particles which are the reaction products between the amine and carbon dioxide. By a major yield is meant that greater than 50% by weight, preferably greater than 75 wt. %, more preferably greater than 90 wt. %, most preferably greater than 97 wt. %, of the solid particles formed are urea group-containing reaction products between the amine and carbon dioxide.

The reaction between carbon dioxide and amine is preferably carried out in situ in the presence of a continuous phase carrier compound. The term amine is defined herein to include monofunctional and polyfunctional amines. The term "polyfunctional amine" is defined to mean an compound containing two or more amino functionalities. The term "dispersion" is taken to mean a discrete two phase system at room temperature, a disperse phase comprised of the solid urea group-containing particles obtained by reacting carbon dioxide with an amine, and a continuous phase carrier in which the particles are dispersed. The disperse phase is substantially insoluble in the continuous phase at room temperature, and does not have any intrinsic reactivity towards the continuous phase. The continuous phase carrier comprises one or more compounds which 1) contains two or more isocyanate reactive hydrogens, 2) has a number average molecular weight of at least 300, and 3) is substantially unreactive toward the amine at room temperature. A suitable continuous phase carrier is one in which the reaction between the amine and carbon dioxide is favored both at ambient temperatures and elevated temperatures up to about 150C. so that the continuous phase carrier remains nonparticipatory throughout the disperse phase forming process.

The dispersion of the invention is stable at room temperatures. By a stable dispersion, it is meant that the solid particles comprising the disperse phase do not coagulate at room temperature in such a fashion as to make the dispersion unusable in foaming applications, nor does the solid phase break down into its respective starting components or into any compound soluble in the continuous phase carrier at temperatures up to 150C. Some dispersions of the invention may phase separate after a period of a week on the shelf, but may shaken or agitated to readily form a substantially even distribution of particulate polymer throughout the continuous phase. In preferred embodiments of the invention, the solid particulates of the disperse phase remain substantially evenly distributed and suspended throughout the continuous phase for a period of at least two weeks, preferably at least four weeks.

The stable dispersion of the invention is formed in situ. The desired amine is added to an appropriate continuous phase carrier compound, which must contain at least two isocyanate reactive hydrogen atoms, to form a homogeneous or a heterogenous mixture. To the mixture is added dry carbon dioxide in a substantially water vapor free environment at below room temperature, ambient temperatures, or optionally elevated temperatures, to form the urea group-containing dispersion used in the invention. If either the mixture or the carbon dioxide is cooled at any stage in the process, the temperature of the reaction mixture comprised of carbon dioxide, amine, and continuous phase carrier must remain at 50° C or above. The ensuing spontaneous exothermic reaction heat of reaction between carbon dioxide and the amine supplies the heat necessary to maintain the reaction at 50° C. or above. Then, to a polyisocyanate is added the dispersion, a urethane forming catalyst, and a blowing agent to form a microcellular, flexible, or rigid foam.

By forming the dispersion in situ, one avoids the time consuming task of forming urea group-containing particles in, for example, a lower molecular weight alcohol, separating the undesired alcohol from the adduct, and adding the adduct to the desired amount of an isocyanate reactive carrier polyol. If desired, one may later dilute the obtained dispersion of the invention with the same or other continuous phase carriers, which otherwise may have been reactive towards the starting amine compound used to form the solid disperse phase. The other continuous phase carriers should not be reactive with the disperse phase particulate polymers, and should be miscible with the original carrier. Another option is to distill off some of the continuous phase carrier to increase the weight percentage of the particulate solid in the dispersion.

The dispersion contains an amount of particulate disperse phase ranging from about 3 weight percent to about 60 weight percent, preferably about 5 wt. % to about 40 wt. %, more preferably about 15 wt. % to about 35 wt. %, based on the combined weight of the continuous phase and the disperse phase. The upper end of the range is limited only by the ability to process a carrier having increased viscosity for the particular application, while the lower bound is limited to producing a product exhibiting improved mechanical properties.

The reaction conditions largely determine whether the formation of a carbamate/amine salt or a urea based polymer condensation product is favored. The formation of the urea group-containing solids of the invention is evidenced by the presence of absorptions attributable to urea linkages in the infrared spectrum and the formation of water as a by-product.

Adding carbon dioxide to the amine under atmospheric pressure limits the reaction toward the formation of carbamate salts of the amine, or also known as ammonium salts of alkylcarbamic acids, and thus super-atmospheric pressure must be used.

In the formation of a carbamate salt of the amine, it is believed that the nitrogen in the amino group reacts with the carbon in the carbon dioxide molecule, with the amino hydrogen abstracting off of the nitrogen atom to neutralize the positive charge, this hydrogen atom (now a proton) bonding to the amino group on a second amine compound to yield an ammonium compound ionically bonded to the negatively charged oxygen from the carbon dioxide as follows:

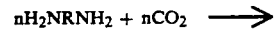

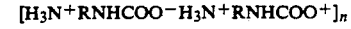

At higher pressures, however, it is believed that the reaction between carbon dioxide and amine proceeds further than the formation of a carbamate salt by condensing water, resulting in a dispersion with a disperse phase being a condensation compound having urea bonding as shown below:

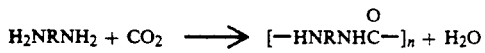

$$H_2NRNH_2 + CO_2 \longrightarrow [-HNRNHC(=O)-]_n + H_2O$$

To obtain a urea based solid particle, the temperature of the reaction mixture comprised of the continuous phase carrier, unreacted amine, and any urea group containing product is maintained at 50° C. or above throughout the carbon dioxide charging phase, and the amine is reacted with carbon dioxide at super-atmospheric pressures, defined as pressures of at least 50 p.s.i.g. The temperature of the reaction mixture throughout the carbon dioxide charging phase is preferably maintained at from about 80° C. to about 280° C., more preferably from about 90° C to about 200° C., most preferably from about 90° C. to about 130° C, at pressures preferably from about 250 p.s.i.g. to 3500 p.s.i.g., more preferably about 1000 p.s.i.g. to about 2800 p.s.i.g., and most preferably from about 2000 p.s.i.g. to about 2400 p.s.i.g.

The temperature may be maintained constant throughout the reaction, varied in a step-wise fashion, or varied in a continuous fashion. Although constant pressure within the reaction vessel can be maintained by pressure releases at various times throughout the procedure, it is preferred to keep the vessel closed to avoid the escape of carbon dioxide.

The reaction between the amine and carbon dioxide under super-atmospheric pressure produces a condensation product, making it necessary to strip off the water prior to adding isocyanate. This may be accomplished by, for example, a rotary evaporation unit.

Suitable amine compounds for use in the present invention include monofunctional, polyfunctional amines, or mixtures thereof with primary or secondary amine groups. The number of amino functionalities is preferably two or three. Each amino group must have at least one active hydrogen to form the carbamate salt of the amine. Preferably, the amine compound contains primary amine group(s) as these are the most reactive with carbon dioxide. Suitable amine compounds are aliphatic, cycloaliphatic, aromatic, arylalkyl compounds, or mixtures thereof, each containing amino groups reactive with carbon dioxide. The amine compounds of the present invention do not contain any hydroxyl groups lest the reaction of the amine compound with carbon dioxide produce a product tending to exhibit solubility in continuous phase polyol carrier at elevated temperatures.

The equivalent weight of the amine compound is limited at the upper range to yielding a reaction product with carbon dioxide that is substantially insoluble in the carrier phase compound. As the equivalent weight of the amine compound increases, the solubility of the reaction product in a continuous phase polyol carrier likewise increases. Thus, the equivalent weight of the amine compound ranges from about 30 to about 200, preferably about 45 to about 120.

A further optional compound that may be employed to react with carbon dioxide is an aminated polyether polyol having an equivalent weight of less than about 200, described in U.S. Pat. Nos. 4,153,581 and 3,654,370, herein incorporated by reference.

Specific examples of suitable monofunctional amines include ammonia, dimethylamine, methylethylamine, diethylamine, diisopropylamine, di-n-propylamine, diallylamine, diisobutylamine, di-n-butylamine, N-methylbenzylamine, phenylehtylamine, N-ethylbenzylamine, di-a-amylamine, dibenzylamine, diphenylamine, n-cotylamine, 2-ethylhexyamine, n-dodecylamine, tetradecylamine, cocoamine, n-hexydecylamine, n-oxtadecylamine, tallow amine, hydrogenated tallow amine, allylamine, soyamine, dihydrogenated amine, dicocoamine, and mixtures thereof.

Specific examples of suitable polyfunctional amines include ethylenediamine, propanediamine, butylenediamine, pentylenediamine, 2-methyl-1,5-pentanediamine, hexanediamine, hexamethylenediamine, dodecamethylenediamine, trimethyldiaminohexane, 2,2'-bisaminopropylmethylamine, diethylenetriamine, triethylenetetraamine and tetraethylenepentamine, dipropylenetriamine, piperazine, N,N'-bis-aminoethylpiperazine, 4-aminobenzylamine, 4-amino-phenylethylamine, I,4-diaminocyclohexane, phenylenediamines, naphthylenediamines, condensates of aniline and formaldehyde such as methylenediphenylamine including bis(4-aminophenyl)methane, toluenediamine, bisaminomethylbenzenes and the derivatives of the above mentioned aromatic amines monoalkylated in one or both nitrogen atoms, and mixtures thereof. Preferred aliphatic diamines and aromatic diamines include ethylenediamine, propanediamine, butanediamine, hexanediamine, heptanediamine, octanediamine, cyclohexanediamine, decanediamine, dodecamethylenediamine, bis(4-aminocyclohexyl)methane, methylenediphenylamine, bis(4-aminophenyl)methane and toluenediamine. Especially preferred is ethylenediamine, propanediamine, butylenediamine, hexanediamine, heptanediamine, octanediamine, decanediamine, bis(4-aminophenyl)methane, bis(4-aminocyclohexyl) methane, and toluenediamine.

The urea group-containing dispersion of the present invention is prepared using any form of carbon dioxide, whether solid, liquid, or gaseous. It is preferred to charge dry carbon dioxide into the reaction vessel to encourage the formation of a discrete disperse phase of solid particles. The carbon dioxide may be of commercial grade, purified or unpurified.

The amount of carbon dioxide supplied to the reaction vessel is dependent on the amount of amine charged into the continuous phase. A dispersion containing unreacted amines produce a foam with extremely short cream times, making processing difficult and the quality of a flexible foam poor. Even where it may be desirable to use an amine as a chain extending agent in some applications, there remains a time and cost drawback in measuring the actual amount of amines left unreacted. Excess amine in the dispersion is difficult to remove by, for example, distillation, as the solid phase tends to coagulate rendering the dispersion unusable. Thus, it is preferable to react all of the amine in the reaction vessel with carbon dioxide. It is desirable to add a several fold excess of carbon dioxide over the stoichiometric ratio to ensure that all of the amine reacts. One mole of carbon dioxide reacts with one amine equivalent.

An optional ingredient employed in the dispersion is a stabilizer. The amount of stabilizer used is sufficient to provide an even distribution of solid particles throughout the continuous phase carrier over a period of at least four weeks, preferably three months. The stabilizing agent is nonparticipatory in the reaction between carbon dioxide and the amine. If a stabilizing agent is used which by nature is interreactive with the formation of the urea group-containing condensate, it must be added after formation of the solid is complete. A stabilizing agent inherently non-interreactive may be added to the continuous phase carrier along with the amine prior to reaction with carbon dioxide.

Suitable stabilizing agents include polydialkylsiloxanes and polysiloxane-polyalkylene oxide block copolymers. Non-silicone surfactants include copolymers of ethylene and propylene oxides; sodium ricinoleicsulfonate; sodium salt of fatty acid; amine salts of fatty acid such as oleic acid diethylamine and stearic acid diethanolamine; alkali metal salts or ammonium salts of sulfonic acids, such a dodecabenzenesulfonic acid and dinaphthylmethane disulfonic acid, fatty acid, such as ricinoleic acid, and polymeric fatty acid. The amount of stabilizer is sufficient to accomplish its purpose, generally from 0.005 to 3.0 wt. % based on the weight of the continuous phase carrier.

The continuous phase carrier is any compound containing at least two isocyanate reactive hydrogens that is substantially unreactive towards the amine and in which the solid disperse phase particles are substantially insoluble. Also, the continuous phase carrier does not participate in the reaction between the amine and carbon dioxide to any appreciable extent. The continuous phase carrier comprises one or more polyols such as hydroxyl terminated polyesters and polyoxyalkylene polyether polyols, alkylene oxide adducts of organic compounds having at least two reactive hydrogen atoms such as amines and thiols, and hydroxy-terminated acetals. The amount of continuous phase carrier comprises 40 to 97 wt. % of the dispersion, preferably 60 to about 90 wt. %, and more preferably 75 to about 90 wt. % of the dispersion.

Representative polyols are often prepared by the catalytic condensation of an alkylene oxide or mixture of alkylene oxides, either simultaneously or sequentially, with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 500 to 10,000, preferably from 750 to 3000.

Any suitable hydroxy-terminated polyester may be used such as are prepared, for example, from polycarboxylic acids and polyhydric alcohols. Any suitable polycarboxylic acid may be used such as oxalic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl) propane, commonly known as Bisphenol A.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 500 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2- butene-1,4-dithiol; and alkyne thiols such as 3-hexyne-1,6-dithiol.

Suitable amines which may be condensed with alkylene oxides include aromatic amines such as aniline, o-chloroaniline, p-phenylenediamine, m-phenylenediamine, o-phenylenediamine, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

The urea group-containing dispersions of the invention may be admixed with other polymeric dispersions to advantageously achieve a combination of improved properties. Other polymeric dispersions which may be added are graft polymer dispersions in either saturated or unsaturated polyoxyalkylene polyether polyols, such as described in U.S. Pat. Nos. 3,931,092; 4,014,846; 4,093,573; and 4,122,056, the disclosures of which are hereby incorporated by reference. The graft polymer dispersions prepared by employing unsaturated polyols are preferred. These are prepared by conducting the in situ polymerization of an ethylenically unsaturated monomer or mixture of monomers in the presence of a free-radical initiator in an unsaturated polyol mixture containing less than 0.1 mole of unsaturation per mole of polyol mixture. The polyol mixture employs as part of the mixture a polyether-ester polyol prepared by the reaction of a polyoxyalkylene polyether polyol with maleic anhydride and capped with an alkylene oxide. This polyether-ester polyol is than isomerized by methods well known to those skilled in the art. Specific details for the preparation of the polyether-ester polyol are found in U.S. Pat. No. 4,550,194 the disclosure of which is incorporated by reference. The graft polymer dispersions have useful viscosities less than 10,000 cps at 25° C. Preferably they have viscosities ranging from 2000 to 8000 cps at 25° C.

The polyurethane foams employed in the present invention are prepared by the reaction of a the carbamate/amine salt dispersion with an organic polyisocyanate in the presence of a blowing agent and optionally in the presence of additional polyhydroxyl-containing components, chain-extending agents, catalysts, surface-active agents, stabilizers, dyes, fillers and pigments. Any of these components which are reactive with the amine in the continuous phase prior to reaction with carbon dioxide, or which are reactive with carbon dioxide, should be added after formation of the urea group dispersion. Suitable processes for the preparation of cellular polyurethane foams are disclosed in U.S. Reissue patent U.S. Pat. No. 24,514 together with suitable machinery to be used in conjunction therewith. It is possible to proceed with the preparation of the inventive polyurethane foams by a prepolymer technique wherein an excess of organic polyisocyanate is reacted in a first step with the urea group-containing dispersion described above to prepare a prepolymer having free isocyanate groups which is then reacted in a second step with water and/or additional dispersion to prepare a foam. Alternatively, the components may be reacted in a single working step commonly known as the "one-shot" technique of preparing polyurethanes.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-( methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4"-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. The isocyanate index ranges from 80–140, preferably 90–110, more preferably 100–105.

Crude polyisocyanates may also be used in the compositions of the present invention, such as crude toluene diisocyanate obtained by the phosgenation of a mixture of toluene diamines or crude diphenylmethane diisocyanate obtained by the phosgenation of crude diphenylmethane diamine.

The polyoxyalkylene polyether polyols may be employed along with another polyhydroxyl-containing component commonly employed in the art. Any of the polyhydroxyl-containing components which are described above for use in the preparation of the urea dispersion may be employed in the preparation of the polyurethane foams useful in the present invention.

The blowing agents which can be employed in this invention include water, liquified gases which have boiling points below 28° C. and above −60° C. and which vaporize at or below the temperature of the foaming mass, or other inert gases such as nitrogen, carbon dioxide, helium and argon. If water is added as the blowing agent, corresponding quantities of excess isocyanate to react with the water and produce carbon dioxide may be used. Suitable liquified gases include fluorinated, partially fluorinated, or halogenated compounds having from 1 to 5, preferably 1–3 carbon atoms; or alkanes or cycloalkanes having 4 to 10, preferably about 4 to 8 carbon atoms. Among these, CFC-11, CFC-22, CFC-113, CFC-114, CFC-123, CFC 123a, CFC-124, CFC-124a, CFC-133 (all isomers), CFC-134, CFC-134a, CFC-141b, CFC-142, CFC-151, 1,1,1-trichloroethane, butane, pentane, cyclopentane, heptane, hexane, perhalogenated alkanes and the like are suitable. Similar alkanes containing bromine atoms are also useful. Among those listed, the "soft" CFC's (those having at least one hydrogen atom) are preferred. CFC-22, CFC-123, CFC-141b, and CFC-142 are especially preferred. Alkenes such as pentene and heptene are also useful. Other blowing agents such as azohexahydrobenzodinitrile may be employed. Any of the above blowing agents may be mixed. The amount of blowing agent will vary the density of the foam, but generally, 1 to 20 weight, preferably about 2 to about 5 weight percent of blowing agent based on the weight of the polyol resin will yield adequately blown foams.

Chain-extending agents which may optionally be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl) ethylenediamine, N,N'-di(2-hydroxypropyl) ethylenediamine, piperazine, and 2-methylpiperazine. Chain extending agents which are reactive with carbon dioxide or primary or secondary amines are added after formation of the dispersion.

Optional flame retardant compounds are tetrakis(2-chloro-ethyl) ethylene phosphonate, pentabromodiphenyl oxide, tris(1,3-dichloropropyl) phosphate, tris(beta-chloroethyl) phosphate, molybdenum trioxide, ammonium molybdate, ammonium phosphate, pentabromodiphenyloxide, tricresyl phosphate, 2,3-dibromopropanol, hexabromocyclododecane, dibromoethyldibromocyclohexane, tris(2,3-dibromopropyl)phosphate, tris(beta-chloropropyl) phosphate, and melamine.

Any suitable urethane forming catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

To produce a stable foam which does not collapse or contain large uneven cells, a surfactant may be used to stabilize the foam. Suitable surfactants include non-ionic surface active agents such as polysiloxane polyoxyalkalene copolymers described in U.S. Pat. Nos. 3,887,500 and 3,957,842; hydroxy terminated polyoxyalkylene pendant groups attached to a polydialkylsiloxane chain as described in U.S. Pat. Nos. 4,746,683 and 4,769,174; a tertiary alcohol-modified siloxane modified polymer as in U.S. Pat. No. 4,039,490; and others such as polyethylene glycol ethers of long chain alcohols, tertiary amine or alkanolamine salts of long chain alkyl of long chain alkyl acid sulfate esters, alkyl sulfonic esters and alkyl arylsulfonic acids.

The foams produced by the urea group-containing dispersion of the invention preferably exhibit a tensile strength of at least 17 p.s.i., a tear strength of at least 3.1, and an elongation of at least 220%.

The following examples illustrate the nature of the invention:

Polyol A is a trimethylolpropane initiated polypropylene oxide-ethylene oxide adduct containing abut 13 wt. % ethylene oxide and a hydroxyl number of 35.

Polyol B is a glycerine initiated propylene oxide-ethylene oxide adduct containing about 18.5 wt. % ethylene oxide and having a hydroxyl number of 35.

DABCO 33 LV is an amine catalyst of 33 wt. % triethylenediamine in 66 wt. % dipropylene glycol.

T-10 is a metal catalyst of 50% stannous octoate in dioctylphthalate commercially available from 6202 is a silicone surfactant.

Isocyanate A is an 80/20 mix of 2,4' and 2,6' isomers of toluene diisocyanate, respectively.

DISPERSION 1

In this and the following examples, carbon dioxide was reacted with an amine under pressure and with externally applied heat to drive the reaction toward the formation of a urea group containing dispersion in a polyol.

To a one gallon stainless steel Autoclave Engineers autoclave steam heatable and capable of operating at pressures of 3300 p.s.i.g., was added at room temperature and atmospheric pressure 60 grams of ethylene 1,2-diamine and 775 grams of Polyol A. The autoclave was sealed, purged three times with nitrogen, and then pressure checked.

About 1500 grams of carbon dioxide was charged to the autoclave, and the mixture stirred for about one hour. Subsequently, steam heat was applied to raise the temperature of the reaction mixture to 90° C. over a period of 3 hours. At the conclusion of the three hour period, the pressure within the vessel had reached 2300 p.s.i.g. The pressure was released, venting the reactor and some of its contents. About 406 grams of a milky appearing suspension was discharged as the remaining product. Water was evaporated at about 50° C. using a rotary evaporation unit under vacuum.

Infrared analysis of the suspension showed peaks at 3300 cm$^{-1}$, 1530 cm$^{-1}$, and 1490 cm$^{-1}$ that were not present in the infrared spectrum of the ethylene diamine-Polyol A starting mixture. These absorption bands confirm the presence of urea groups.

DISPERSION 2

The same autoclave as used in Dispersion 1 was charged with 116 grams of hexane 1,6-hexanediamine and 775 grams of Polyol A at room temperature and atmospheric pressure. After the autoclave was sealed, nitrogen purged three times, and pressure checked, about 1200 grams of carbon dioxide was charged. The reaction mixture was stirred for 1 hour, after which steam heat was applied to raise the temperature of the mixture to 90° C. over a period of 1 hour. At that time, the pressure in the reactor was 2150 p.s.i.g. After 15 minutes at 90° C., the contents in the reactor were cooled to room temperature, vented, and discharged to yield 708 g of a milky-white dispersion.

DISPERSION 3

This example illustrates the spontaneous reaction between carbon dioxide added stepwise and an amine in a closed jacketed vessel water cooled throughout the procedure to form a urea group-containing dispersion.

Using the same autoclave as in Dispersion 1, about 150 grams of propane diamine and 1500 grams of Polyol B were charged at room temperature and atmospheric pressure. The autoclave was sealed, twice purged with nitrogen, and then pressure checked. The carbon dioxide was charged in two stages, the first with 989 grams added over 4 hours, and the second with 510 grams more charged over a period of 2 hours 15 minutes. An exotherm ensued during the charging of the carbon dioxide spontaneously raising the temperature of the reaction mixture from 22° C. to 57° C. No external heating was applied during the reaction or addition steps. Thirty minutes after completion of the second carbon dioxide charge, the autoclave was vented. Total addition and reaction time was 9 hours. The reaction was then gently heated after venting and 494 grams of a viscous dispersion was discharged. Water was stripped off and the dispersion bottled.

After one month of allowing the dispersion to sit, there was no pressure in the bottle and only slight settling had occurred, indicating a stable dispersion had been produced with good shelf life. This bottled dispersion was used to make a polyurethane foam.

FOAM EXAMPLE

About 150 grams of Dispersion 3, 150 grams of polyol B, 2 grams of L6202, and 9 grams of water, and 0.8 grams of DABCO 33LV were mixed for 30 seconds using a Lightning Model V-7 stirrer equipped with a shrouded mixing blade. About 0.8 grams of T-10 catalyst were then added to the mixture and stirred for another 15 seconds. Subsequently, 106.7 grams of Isocyanate A was added, mixed for 10 seconds, poured into a 10"×10"×6"box, and allowed to rise freely. The formed foam filled the box, was firm to the touch, and had a free rise time of 150 seconds. The physical properties of the foam were evaluated in accordance with ASTM D-3574 and presented below in the Table:

TABLE 1

| | |
|---|---|
| Density | 1.91 p.c.f. |
| ILD, 65% (1 sq. in.) | 1.55 lbs. |
| Tensile Strength | 18.3 p.s.i. |
| Elongation % | 256.7% |
| Tear Resistance | 3.6 p/i |
| Air Flow | 0.11 c.f.m. |

Typical urea group-containing dispersions of polyisocyanurate dispersions exhibit tensile strengths from 10–15 p.s.i., elongation percentages from 100–200, tear strengths from 1.5–2.5 p/i, and ILD's at 65% compression of about 1.3 to 2.0 for TDI based foams at equivalent densities. The results above indicate improvements in tensile, tear, and elongation properties for a foam prepared by the urea group-containing dispersion of this invention over conventional urea group-containing dispersions.

We claim:

1. A stable urea group dispersion comprised of a disperse phase and a continuous phase, the disperse phase being solids comprised of urea group-containing reaction products of carbon dioxide and an amine which is free of hydroxyl groups, and the continuous phase comprised of a carrier compound having at least two isocyanate reactive hydrogens.

2. The urea group dispersion of claim 1, wherein the amine is a polyfunctional amine having primary functional amino groups.

3. The urea group dispersion of claim 1, wherein the reaction between carbon dioxide and the amine is carried out in the presence of the carrier compound.

4. The urea group dispersion of claim 1, wherein the amount of solids in the continuous phase ranges from about 5 wt. % to about 35 wt. % based on the weight of the carrier compound.

5. The urea group dispersion of claim 1, wherein the carrier compound has a number average molecular weight of at least 300.

6. The urea group dispersion of claim 1, wherein the amine has an equivalent weight from about 45 to 120.

7. The urea group dispersion of claim 1, wherein the amine is selected from the group consisting of ethylenediamine, propylenediamine, butylenediamine, hexanediamine, heptanediamine, octanediamine, decanediamine, bis(4-aminocyclohexyl)methane and mixtures thereof.

8. The urea group dispersion of claim 1, wherein said solids comprise greater than about 75 weight percent urea group-containing reaction products of said carbon dioxide and said amine.

9. A polyurethane foam comprising the reaction of a urea group dispersion, an organic polyisocyanate, a polyurethane promoting catalyst, and a blowing agent, wherein the urea group dispersion is comprised of a disperse phase and a continuous phase, the disperse phase being solids comprised of urea group-containing reaction products of carbon dioxide and an amine which is free of hydroxyl groups, and the continuous phase comprised of a carrier compound having at least two isocyanate reactive hydrogens.

10. The polyurethane foam of claim 9, wherein the amine is a polyfunctional amine having primary functional amino groups.

11. A non-cellular polyurethane product comprising the reaction between a urea group dispersion, an organic polyisocyanate, and a polyurethane promoting catalyst, wherein the urea group dispersion is comprised of a disperse phase and a continuous phase, the disperse phase being solids comprised of urea group-containing reaction products of carbon dioxide and an amine which is free of hydroxyl groups, and the continuous phase comprised of a carrier compound having at least two isocyanate reactive hydrogens.

12. A process for preparing a urea group-containing dispersion, comprising reacting carbon dioxide with an amine which is free of hydroxyl groups in the presence of a continuous phase carrier compound having at least two isocyanate reactive hydrogens under super-atmospheric pressure and the temperature of said reaction is maintained at 50° C. or above.

13. The process of claim 12, wherein the reaction between carbon dioxide and the amine is carried out at pressures ranging from about 500 p.s.i. to about 3000 p.s.i.

14. The process of claim 13, wherein the pressure ranges from about 2000 p.s.i.g. to about 2400 p.s.i.g.

15. The process of claim 12, wherein the reaction between carbon dioxide and the amine is carried out at temperatures ranging from about 80° C. to about 280° C.

16. The process of claim 15, wherein the temperature ranges from about 90° C. to about 130° C.

17. The process of claim 12, wherein said urea group-containing dispersion, a polyisocyanate, a polyurethane promoting catalyst, and optionally a blowing agent, a flame retardant, and/or a surfactant are reacted to obtain a product selected from the group consisting of a polyurethane foam, an integral skin polyurethane foam, a microcellular polyurethane foam, a noncellular polyurethane elastomer, a polyurethane coating, and a polyurethane casting.

* * * * *